(12) United States Patent
Bryant et al.

(10) Patent No.: US 10,189,677 B2
(45) Date of Patent: Jan. 29, 2019

(54) ELEVATOR CONTROL SYSTEM WITH FACIAL RECOGNITION AND AUTHORIZED FLOOR DESTINATION VERIFICATION

(71) Applicants: Edward A. Bryant, Maplewood, NJ (US); Arthur Scott McClure, Southbury, CT (US)

(72) Inventors: Edward A. Bryant, Maplewood, NJ (US); Arthur Scott McClure, Southbury, CT (US)

(73) Assignee: Edward A. Bryant, Maplewood, NJ (US)

( * ) Notice: Subject to any disclaimer, the term of this patent is extended or adjusted under 35 U.S.C. 154(b) by 264 days.

(21) Appl. No.: 14/915,506

(22) PCT Filed: Oct. 29, 2014

(86) PCT No.: PCT/US2014/062829
§ 371 (c)(1),
(2) Date: Feb. 29, 2016

(87) PCT Pub. No.: WO2015/099882
PCT Pub. Date: Jul. 2, 2015

(65) Prior Publication Data
US 2016/0311646 A1    Oct. 27, 2016

Related U.S. Application Data

(60) Provisional application No. 61/927,172, filed on Jan. 14, 2014, provisional application No. 61/919,902, filed on Dec. 23, 2013.

(51) Int. Cl.
B66B 1/20        (2006.01)
B66B 1/46        (2006.01)
G06K 9/00        (2006.01)

(52) U.S. Cl.
CPC .......... *B66B 1/468* (2013.01); *G06K 9/00288* (2013.01); *B66B 2201/4638* (2013.01);
(Continued)

(58) Field of Classification Search
CPC ............ B66B 1/468; B66B 2201/4638; B66B 2201/4676; B66B 2201/4646; G06K 9/00288
(Continued)

(56) References Cited

U.S. PATENT DOCUMENTS 4,482,032 A    11/1984 Enriquez et al.
4,534,059 A    8/1985 Yamada et al.
(Continued)

FOREIGN PATENT DOCUMENTS

| JP | 2005306584 A | 11/2005 |
|---|---|---|
| JP | 2011251846 A | 12/2011 |
| WO | 2006017881 A1 | 2/2006 |

*Primary Examiner* — Anthony Salata
(74) *Attorney, Agent, or Firm* — DeLio, Peterson & Curcio, LLC; David R. Pegnataro

(57) ABSTRACT

An automated elevator control system using facial recognition. The system is capable of recognizing an elevator passenger's face in a field of view of an imaging device in close proximity to the elevator car, capturing the elevator passenger's facial image using video data output from the imaging device, and comparing the captured facial image to pre-registered facial image data in a database storing corresponding authorized floor destination data for each passenger. Upon determining a match between the captured facial image and a stored facial image, the system is capable of sending a signal to the elevator control system to move the elevator car to the elevator passenger's authorized floor destination.

20 Claims, 5 Drawing Sheets

(52) U.S. Cl.
CPC .............. *B66B 2201/4646* (2013.01); *B66B 2201/4676* (2013.01)

(58) Field of Classification Search
USPC ....... 187/247, 380–388, 391, 392, 395, 396, 187/901; 382/103, 118, 209; 715/762–765, 863, 864
See application file for complete search history.

(56) References Cited

U.S. PATENT DOCUMENTS

| | | | | |
|---|---|---|---|---|
| 6,382,363 | B1* | 5/2002 | Friedli | B66B 1/468 187/384 |
| 6,772,862 | B2* | 8/2004 | Friedli | B66B 1/2458 187/247 |
| 7,079,669 | B2 | 7/2006 | Hashimoto et al. | |
| 7,145,433 | B2* | 12/2006 | Gerstenkorn | B66B 1/468 340/5.22 |
| 7,877,707 | B2* | 1/2011 | Westerman | G06F 3/04883 715/863 |
| 8,020,672 | B2* | 9/2011 | Lin | B66B 1/34 187/316 |
| 8,061,485 | B2* | 11/2011 | Finschi | B66B 1/468 187/384 |
| 8,485,317 | B2* | 7/2013 | Gerstenkorn | B66B 1/468 187/247 |
| 8,857,569 | B2* | 10/2014 | Friedli | B66B 5/0012 187/384 |
| 8,915,334 | B2* | 12/2014 | Finschi | B66B 1/2408 187/249 |
| 9,079,749 | B2* | 7/2015 | Hsieh | B66B 3/002 |
| 2010/0332648 | A1 | 12/2010 | Bohus et al. | |
| 2012/0160613 | A1 | 6/2012 | Friedli | |
| 2012/0168262 | A1 | 7/2012 | Finschi | |
| 2013/0220740 | A1 | 8/2013 | Yoo | |
| 2013/0247175 | A1 | 9/2013 | Nechyba et al. | |
| 2016/0031675 | A1* | 2/2016 | Silvennoinen | B66B 1/468 187/247 |
| 2016/0214830 | A1* | 7/2016 | Simcik | B66B 1/468 |
| 2016/0251198 | A1* | 9/2016 | Salmikuukka | B66B 1/2458 187/388 |

* cited by examiner

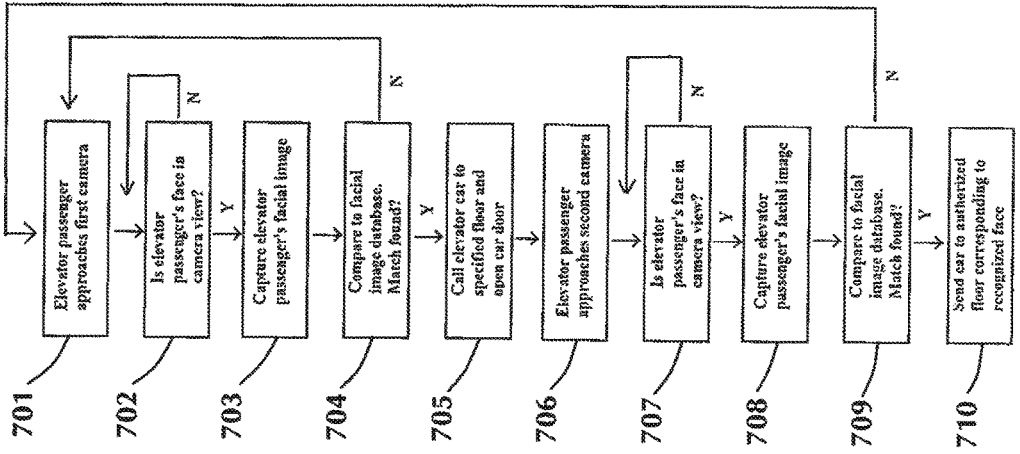
FIG. 7
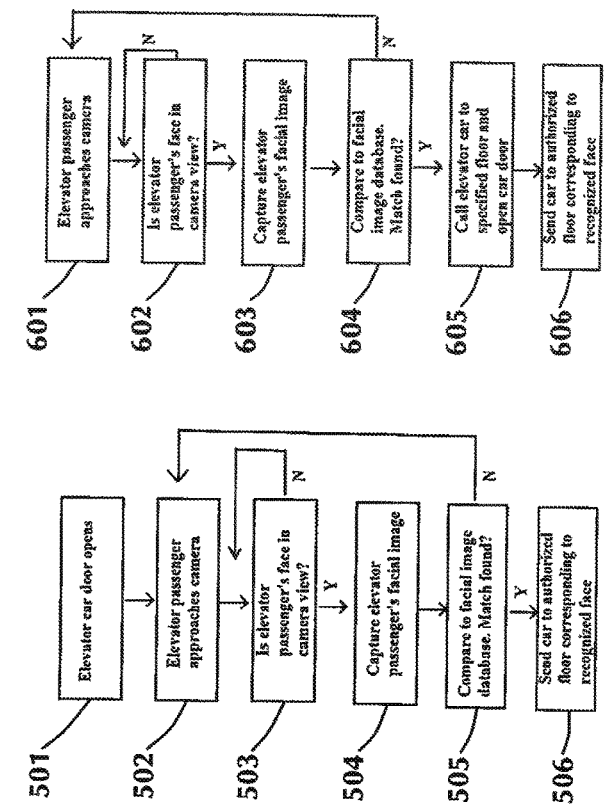
FIG. 6
FIG. 5

ELEVATOR CONTROL SYSTEM WITH FACIAL RECOGNITION AND AUTHORIZED FLOOR DESTINATION VERIFICATION

RELATED APPLICATIONS

This application is a National Phase filing pursuant to 35 U.S.C. § 371 of PCT/US2014/062829 filed Oct. 29, 2014, which claims priority to U.S. Provisional Patent Application No. 61/927,172, filed Jan. 14, 2014 and U.S. Provisional Patent Application No. 61/919,902, filed Dec. 23, 2013.

BACKGROUND OF THE INVENTION

1. Field of the Invention

The present invention relates to elevator control systems and specifically, systems which implement facial or voice recognition within the control system.

2. Description of Related Art

A conventional elevator control system consists of an elevator car, or multiple elevator cars in a bank of elevators, which are controlled by a central control system (using either relay logic or microprocessor based) which may be located in the elevator shaft or in a separate mechanical room elsewhere in the building. The typical system requires an elevator passenger to physically press a floor button within the elevator car which corresponds to the desired floor the person wishes to reach, and the control system then signals the elevator car to move to the desired floor. This system poses a number of potential problems, including but not limited to, security issues, convenience, and infection control.

SUMMARY OF THE INVENTION

Bearing in mind the problems and deficiencies of the prior art, it is therefore an object of the present invention to provide an improved elevator control system which does not require physical contact between an elevator passenger and a button surface in the elevator car to select the desired floor.

It is another object of the present invention to provide an elevator control system which implements facial recognition within the control system.

It is another object of the present invention to provide an elevator control system which matches a floor location with a face recognized by the imaging portion of the system and initiates movement of the elevator car to that floor location.

It is another object of the present invention to provide an improved elevator control system which restricts access to certain floors for non-authorized persons.

It is yet another object of the present invention to provide an elevator control system which implements audio recognition within the control system.

It is still another object of the present invention to provide an elevator control system which matches a floor location with an audio segment recognized by the processing portion of the system and initiates movement of the elevator car to that floor location.

The above and other objects, which will be apparent to those skilled in the art, are achieved in the present invention which is directed to a method for controlling an elevator car using facial recognition, comprising the steps of providing an elevator car, the elevator car controlled by an elevator control system, providing a facial image database comprising facial image data of authorized passengers and corresponding authorized floor destination data for each such passenger, providing a facial recognition program capable of comparing a facial image stored in the facial image database to video data output from an imaging device, the facial recognition program in communication with the elevator control system, providing an imaging device capable of outputting video data, recognizing a facial image of an elevator passenger's face in a field of view of the imaging device, capturing the elevator passenger's facial image using video data output from the imaging device, comparing the captured facial image to the facial image data, determining a match between the captured facial image and a facial image stored in the facial image database, and sending a signal to the elevator control system to move the elevator car to the elevator passenger's authorized floor destination.

The present invention is further directed to a method for controlling an elevator car using facial recognition, comprising the steps of providing an elevator car, the elevator car controlled by an elevator control system, providing a facial image database comprising facial image data of authorized passengers and corresponding authorized floor destination data for each such passenger, providing a facial recognition program capable of comparing a facial image stored in the facial image database to video data output from an imaging device, the facial recognition program in communication with the elevator control system, providing an imaging device capable of outputting video data, detecting an elevator passenger's upturned head and recognizing a facial image of the elevator passenger's face in a field of view of the imaging device, capturing the elevator passenger's facial image using video data output from the imaging device, comparing the captured facial image to the facial image data, determining a match between the captured facial image and a facial image stored in the facial image database, and sending a signal to the elevator control system to move the elevator car to the elevator passenger's authorized floor destination.

The imaging device may be positioned inside the elevator car. More than one elevator passenger may be simultaneously entering or present in the elevator car and the method may be applied to each elevator passenger prior to sending a signal to the elevator control system to move the elevator car to each elevator passenger's authorized floor destination. Alternatively, the imaging device may be positioned on an exterior wall adjacent to an elevator shaft containing the elevator car. The elevator car may be one of a plurality of elevator cars in a bank of elevators.

The method may further include the step of sending a signal to the elevator control system to call the elevator car in the preferred up/down direction prior to sending a signal to the elevator control system to move the elevator car to the elevator passenger's authorized floor destination.

The facial image database may be comprised of facial image data of authorized passengers which was captured by a second imaging device. The second imaging device may be included in a portable computer device or a stationary computer device.

The method may further include the step of recognizing a specific body gesture of the elevator passenger to override the signal to the elevator control system to move the elevator car to the elevator passenger's authorized floor destination.

The method may further include the step of providing a feedback signal indicating the presence of a recognized elevator passenger in the field of view of the imaging device. The feedback signal may be visual or audible. The method may further include the step of providing a second feedback signal indicating the selected floor destination. The second feedback signal may be visual or audible.

The present invention is further directed to a method for controlling an elevator car using facial recognition, comprising the steps of providing an elevator car, the elevator car controlled by an elevator control system, providing a facial image database comprising facial image data of authorized passengers and corresponding authorized floor destination data for each such passenger, providing a facial recognition program capable of comparing a facial image stored in the facial image database to video data output from a first and second imaging device, the facial recognition program in communication with the elevator control system, providing a first imaging device capable of outputting video data, the first imaging device positioned on an exterior wall adjacent to an elevator shaft containing the elevator car, providing a second imaging device capable of outputting video data, the second imaging device positioned inside the elevator car, recognizing a facial image of an elevator passenger's face in a field of view of the first imaging device, capturing the elevator passenger's facial image using video data output from the first imaging device, comparing the captured facial image to the facial image data, determining a match between the captured facial image and a facial image stored in the facial image database, sending a signal to the elevator control system to call the elevator car in a preferred up/down direction, recognizing a facial image of an elevator passenger's face in a field of view of the second imaging device, capturing the elevator passenger's facial image using video data output from the second imaging device, comparing the captured facial image to the facial image data, determining a match between the captured facial image and a facial image stored in the facial image database, and sending a signal to the elevator control system to move the elevator car to the elevator passenger's authorized floor destination.

The present invention is further directed to a method for controlling an elevator car using facial recognition, comprising the steps of providing an elevator car, the elevator car controlled by an elevator control system, providing a facial image database comprising facial image data of authorized passengers and corresponding authorized floor destination data for each such passenger, providing a facial recognition program capable of comparing a facial image stored in the facial image database to video data output from a first and second imaging device, the facial recognition program in communication with the elevator control system, providing a first imaging device capable of outputting video data, the first imaging device positioned on an exterior wall adjacent to an elevator shaft containing the elevator car, providing a second imaging device capable of outputting video data, the second imaging device positioned inside the elevator car, detecting an elevator passenger's upturned head and recognizing a facial image of the elevator passenger's face in a field of view of the first imaging device, capturing the elevator passenger's facial image using video data output from the first imaging device, comparing the captured facial image to the facial image data, determining a match between the captured facial image and a facial image stored in the facial image database, sending a signal to the elevator control system to call the elevator car in a preferred up/down direction, detecting an elevator passenger's upturned head and recognizing a facial image of the elevator passenger's face in a field of view of the second imaging device, capturing the elevator passenger's facial image using video data output from the second imaging device, comparing the captured facial image to the facial image data, determining a match between the captured facial image and a facial image stored in the facial image database, and sending a signal to the elevator control system to move the elevator car to the elevator passenger's authorized floor destination.

The elevator car may be one of a plurality of elevator cars in a bank of elevators. More than one elevator passenger may be simultaneously present in the elevator car and the method may be applied to each elevator passenger prior to sending a signal to the elevator control system to move the elevator car to each elevator passenger's authorized floor destination.

The facial image database may be comprised of facial image data of authorized passengers which was captured by a third imaging device. The third imaging device may be included in a portable computer device or a stationary computer device.

The method may further include the step of recognizing a specific body gesture of the elevator passenger to override the signal to the elevator control system to move the elevator car to the elevator passenger's authorized floor destination.

The method may further include the step of providing a feedback signal indicating the presence of a recognized elevator passenger in the field of view of the first imaging device the selected floor destination. The feedback signal may be visual or audible. The method may further include the step of providing a second feedback signal indicating the presence of a recognized elevator passenger in the field of view of the second imaging device. The second feedback signal may be visual or audible. The method may further include the step of providing a third feedback signal indicating the selected floor destination. The third feedback signal may be visual or audible.

The present invention is further directed to an automated elevator control system using facial recognition, comprising an elevator car, the elevator car controlled by an elevator control system, a facial image database comprising facial image data of authorized passengers and corresponding authorized floor destination data for each such passenger, a facial recognition program capable of comparing a facial image stored in the facial image database to video data output from an imaging device, the facial recognition program in communication with the elevator control system, and an imaging device capable of outputting video data. The system is capable of recognizing a facial image of an elevator passenger's face in a field of view of the imaging device, capturing the elevator passenger's facial image using video data output from the imaging device, and comparing the captured facial image to the facial image data. Upon determining a match between the captured facial image and a facial image stored in the facial image database, the system is capable of sending a signal to the elevator control system to move the elevator car to the elevator passenger's authorized floor destination.

The present invention is further directed to an automated elevator control system using facial recognition, comprising an elevator car, the elevator car controlled by an elevator control system, a facial image database comprising facial image data of authorized passengers and corresponding authorized floor destination data for each such passenger, a facial recognition program capable of comparing a facial image stored in the facial image database to video data output from an imaging device, the facial recognition program in communication with the elevator control system, and an imaging device capable of outputting video data. The system is capable of detecting an elevator passenger's upturned head and recognizing a facial image of the elevator passenger's face in a field of view of the imaging device, capturing the elevator passenger's facial image using video data output from the imaging device, and comparing the captured facial image to the facial image data. Upon determining a match between the captured facial image and a facial image stored in the facial image database, the system is capable of sending a signal to the elevator control system to move the elevator car to the elevator passenger's authorized floor destination.

The imaging device may be positioned inside the elevator car and the system may be capable of recognizing more than one elevator passenger simultaneously entering or present in the elevator car. Alternatively, the imaging device may be positioned on an exterior wall adjacent to an elevator shaft containing the elevator car. The imaging device may also be positioned on an exterior wall adjacent to a bank of elevators containing more than one elevator car.

Upon determining a match between the captured facial image and a facial image stored in the facial image database, the system may be capable of sending a signal to the elevator control system to call the elevator car in the preferred up/down direction prior to sending a signal to the elevator control system to move the elevator car to the elevator passenger's authorized floor destination.

The facial image database may be comprised of facial image data of authorized passengers which was captured by a second imaging device. The second imaging device may be included in a portable computer device or a stationary computer device.

The system may further comprise a feedback signal indicating the presence of a recognized elevator passenger in the field of view of the imaging device. The feedback signal may be visual or audible. The system may further comprise a second feedback signal indicating the selected floor destination. The second feedback signal may be visual or audible.

The facial image data of authorized passengers and corresponding authorized floor destination data for each such passenger may be registered in the facial image database using a software application program.

The present invention is further directed to an automated elevator control system using facial recognition, comprising an elevator car, the elevator car controlled by an elevator control system, a facial image database comprising facial image data of authorized passengers and corresponding authorized floor destination data for each such passenger, a facial recognition program capable of comparing a facial stored in the facial image database to video data output from a first and second imaging device, the facial recognition program in communication with the elevator control system, a first imaging device capable of outputting video data, the first imaging device positioned on an exterior wall adjacent to an elevator shaft containing the elevator car, and a second imaging device capable of outputting video data, the second imaging device positioned in the elevator car. The system is capable of recognizing a facial image of an elevator passenger's face in a field of view of the first imaging device, capturing the elevator passenger's facial image using video data output from the first imaging device, and comparing the captured facial image to the facial image data. Upon determining a match between the captured facial image and a facial image stored in the facial image database, the system is capable of sending a signal to the elevator control system to call the elevator car in a preferred up/down direction. The system is further capable of recognizing a facial image of an elevator passenger's face in a field of view of the second imaging device, capturing the elevator passenger's facial image using video data output from the second imaging device, and comparing the captured facial image to the facial image data. Upon determining a match between the captured facial image and a facial image stored in the facial image database, the system is further capable of sending a signal to the elevator control system to move the elevator car to the elevator passenger's authorized floor destination.

The present invention is further directed to an automated elevator control system using facial recognition, comprising an elevator car, the elevator car controlled by an elevator control system, a facial image database comprising facial image data of authorized passengers and corresponding authorized floor destination data for each such passenger, a facial recognition program capable of comparing a facial stored in the facial image database to video data output from a first and second imaging device, the facial recognition program in communication with the elevator control system, a first imaging device capable of outputting video data, the first imaging device positioned on an exterior wall adjacent to an elevator shaft containing the elevator car, and a second imaging device capable of outputting video data, the second imaging device positioned in the elevator car. The system is capable of detecting an elevator passenger's upturned head and recognizing a facial image of the elevator passenger's face in a field of view of the first imaging device, capturing the elevator passenger's facial image using video data output from the first imaging device, and comparing the captured facial image to the facial image data. Upon determining a match between the captured facial image and a facial image stored in the facial image database, the system is capable of sending a signal to the elevator control system to call the elevator car in a preferred up/down direction. The system is further capable of detecting an elevator passenger's upturned head and recognizing a facial image of the elevator passenger's face in a field of view of the second imaging device, capturing the elevator passenger's facial image using video data output from the second imaging device, and comparing the captured facial image to the facial image data. Upon determining a match between the captured facial image and a facial image stored in the facial image database, the system is further capable of sending a signal to the elevator control system to move the elevator car to the elevator passenger's authorized floor destination.

The elevator car may be one of a plurality of elevator cars in a bank of elevators.

The facial image database may be comprised of facial image data of authorized passengers which was captured by a third imaging device. The third imaging device may be included in a portable computer device or a stationary computer device.

The system may further comprise a feedback signal indicating the presence of a recognized elevator passenger in the field of view of the first imaging device. The feedback signal may be visual or audible. The system may further comprise a second feedback signal indicating the presence of a recognized elevator passenger in the field of view of the second imaging device. The second feedback signal may be visual or audible. The system may further comprise a third feedback signal indicating the selected floor destination. The third feedback signal may be visual or audible.

The facial image data of authorized passengers and corresponding authorized floor destination data for each such passenger may be registered in the facial image database using a software application program.

The system may be capable of recognizing more than one elevator passenger simultaneously entering or present in the elevator car.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 5 is a flowchart of the elevator control system according to one embodiment of the present invention as shown in FIG. 1.

FIG. 6 is a flowchart of the elevator control system according to another embodiment of the present invention as shown in FIG. 2.

FIG. 7 is a flowchart of the elevator control system according to yet another embodiment of the present invention as shown in FIG. 3.

DESCRIPTION OF THE EMBODIMENT(S)

Figure 2:
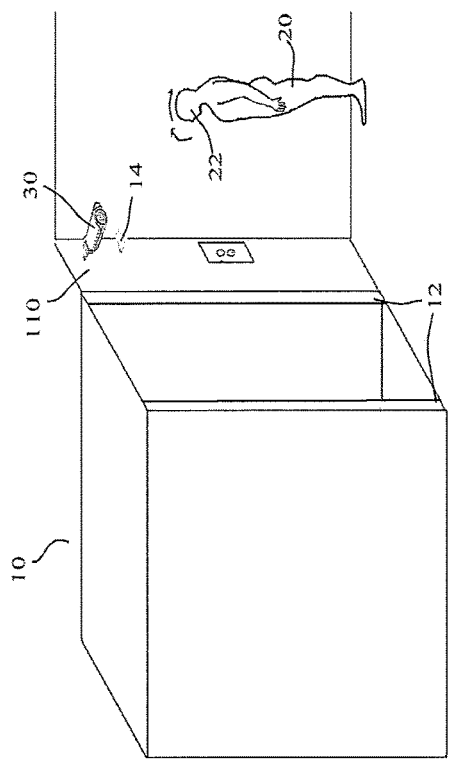
FIG. 2 is a left side perspective view of an elevator car controlled by the elevator control system according to another embodiment of the present invention, showing an imaging device on an exterior wall adjacent to the elevator car and a passenger triggering a control system response.

In describing the preferred embodiment of the present invention, reference will be made herein to FIGS. 1-8 of the drawings in which like numerals refer to like features of the invention.

The present invention employs the use of facial recognition, in combination with a pre-registered facial image database comprising facial image data of prospective elevator passengers and corresponding authorized floor destination data, to send a signal to an elevator control system to move an elevator car to a desired floor, similar to the signal a conventional elevator control system receives by an individual pushing a floor button. The elevator control system of the present invention can be used for various purposes including, but not limited to, security (restricting access to floors for non-authorized persons), convenience (the ability to select a desired floor with one's hands unavailable), infection control (avoiding the spread of germs by eliminating the need to physically contact a button surface), disabled access (for persons unable to press the floor selection buttons due to physical disability), and as an alternate to Shabbat elevator operation (wherein during Shabbat observance, an elevator is configured to stop on every floor to prevent a Shabbat observer from having to operate the elevator buttons).

The elevator control system of the present invention uses any combination of 1) facial recognition; 2) facial recognition, in combination with a body gesture; and/or 3) vocal command. The system of the present invention can be configured to replace the conventional elevator system entirely (limiting the use of the elevator to recognized passengers only) or can be configured as a supplement to the conventional system, wherein the use of facial recognition and/or vocal command are additional methods of controlling the elevator car's movement and the passenger may still use the conventional "button press" method. The system of the present invention may also be configured to override the conventional elevator system in various areas of the building or at specific times, as necessary, thereby limiting the use of the elevator to recognized passengers only at desired times.

The elevator control system according to the present invention allows building residents to approach a camera positioned either on a wall adjacent to any of their building's elevators or inside of the elevator car itself, and after looking at the appropriate camera to allow for facial recognition, call an elevator car (if necessary), and have the elevator car initiate movement and stop at his or her authorized floor. The passenger's facial image may be detected outside of the elevator, inside of the elevator, or as the passenger is entering the elevator car, and the system is capable of recognizing more than one passenger simultaneously approaching the camera, regardless of whether the camera is positioned on a wall adjacent to the elevator or is positioned inside of the elevator car. For single elevators, a passenger's up/down preference and the specific floor call may be triggered at the same time by a camera located either in the elevator car or on an exterior wall adjacent the elevator car. For multiple elevators in a bank of elevators, the passenger's up/down preference may be triggered by a camera located on an exterior wall adjacent the elevator car, and the specific floor call may then be triggered by a second camera located in the elevator car. The record of each individual action need not exceed nor persist beyond the current elevator camera surveillance practice.

The elevator control system of the present invention includes at least one camera capable of outputting video data and in communication with a facial recognition program. The camera may be positioned either on a wall adjacent to a building's elevator (or bank of elevators) or inside of the elevator car itself, and is used to capture an elevator passenger's facial image. The camera may either be an analog video camera or digital network camera. Resolution of the camera must meet or exceed the minimum requirements of the facial recognition system, typically a minimum of 50 pixels between the eyes of the person to identify. Accurate facial recognition requires a minimum resolution of the face to be identified as well as a limit to the head roll (tilt), pitch (nod) and yaw (bobble). To insure that these requirements are met, an alignment mechanism may be employed within the elevator control system of the present invention. The alignment mechanism will account for the potentially significant differences in height of individuals (from the height of a child or seated person to the height of an above average person). To accomplish this alignment, as well as to ensure that the individual's face sufficiently fills the image frame, placement of the camera may be combined with an optical device mounted to or in close proximity to the camera and aligned to the center of the field of view of the camera, which is in view as the individual approaches the camera. The alignment device may consist of an illuminated indicator within a tube or with lensing to limit its viewing angle, or a mechanical tool consisting of two parts which align when viewed from the proper position. With one of these alignment devices in use, as the individual approaches the camera and enters the camera's field of view, he or she will be in the optimal position for facial recognition relative to the camera.

The facial recognition program may be a software application run on a computing device located on-board the elevator (or in the elevator machine room), on a desktop or laptop computer located in the building's management/security office, or on a computing device located elsewhere. The computing device will accept the video signal from the camera either by analog video input or via Ethernet communications (wired or wireless). The facial recognition program may function by matching arrays of distinguishable facial landmarks. The registration of an individual into the system, as well as the identification of that individual, may be accomplished using a variety of methods, including "faceprint" methodology (wherein an array of nodal points are identified and stored), three dimensional mapping of features, or by facial surface texture analysis. For security purposes, the facial recognition program may include an algorithm to differentiate between a "live" face and a photograph. The algorithm may use a series of recorded images of the face to be recognized and will assess variations between the frames (such as head position and angle changes, as well as slight facial expression changes) to verify that the face is "live". The facial recognition system may also include gesture recognition (facial, hand or body) to allow the passenger to confirm his/her floor choice. Gesture recognition also provides a mechanism for the passenger to enter the elevator and select an alternate floor, rather than the system's automatic selection of the individual's authorized floor.

Initial facial images of prospective elevator passengers are pre-registered in a facial image database, which is integrated with the facial recognition program. The facial image database may be created and added to by a system operator, such as the building manager. The initial imaging device may be a camera connected to a stationary computer for inputting the initial images of the elevator passengers' faces. A smartphone, tablet, laptop or other camera integrated within a portable device or system may also be used to capture and input the initial images into the facial image database. There may be at least two images taken of each passenger to account for occasional changes in facial appearance, such as if the passenger occasionally wears glasses. The passenger's facial image may be updated in the system at any time to account for more significant changes in facial appearance, such as modification of facial hair and the like. The facial image database may also have the capability to have new facial images added at any time, and to automatically delete facial images after a specific period of time, such as yearly, to keep inventory current.

The software employed in the present invention may have three parts: 1) a camera link to a facial recognition program, for example, using a building manager's smart phone; 2) a facial recognition program that contains a database of facial images of residents and their authorized floors—no names or apartment numbers; and 3) a discrete output signal, integrated within the elevator operator control system, indicating at which floor to stop the elevator car. This last step may be customized for each type of elevator manufacturer. The facial image database has sufficient capacity for the number of expected elevator users, which may be one thousand or more distinct faces for large residential buildings.

The elevator control system of the present invention may include an elevator control overlay capable of communicating with the facial recognition program and/or a vocal command system (via wired or wireless Ethernet) to receive commands and return elevator status, and may be capable of issuing "floor calls" to the elevator control system. In an embodiment of the present invention where the facial recognition program is located within the elevator machine room, the elevator control overlay interface may be integrated into the facial recognition program. This system component may be an overlay to the elevator controls using output relays or solid state switching components to trigger the applicable circuits within the elevator control system to place "car calls" (floor selections). Alternatively, this may be accomplished by digital communication to the elevator control system or via integration into the control panel within the elevator. The latter two options provide an opportunity for an elevator manufacturer to integrate this functionality into the elevator system. In any of these implementations, if the elevator has an internal control panel, the individual's floor selection will be acknowledged on the panel as if the individual pressed the button for the desired floor.

The elevator control system of the present invention may also include a voice recognition system including a microphone within the elevator, audio capture hardware, and software to capture, filter and match vocal commands. The voice recognition system may use a registration process, similar to that of the facial recognition system, to build a database of authorized users. The registration of authorized users may be completed in the elevator car itself (using the elevator interface and its microphone or audio input device), at a management computer for the voice recognition system, or via a portable device or system.

One embodiment of the voice recognition system may be initiated upon opening of the elevator car door. When an audio segment is received, the audio segment is compared to registered audio segments in the audio segment database. If no match is found, the system may wait for another audio segment. When a match is found between the received audio segment and an audio segment in the database, the system determines if a specific voice command has been detected. If a specific voice command is detected, the elevator car is sent to the floor corresponding with the recognized audio segment.

Figure 1:
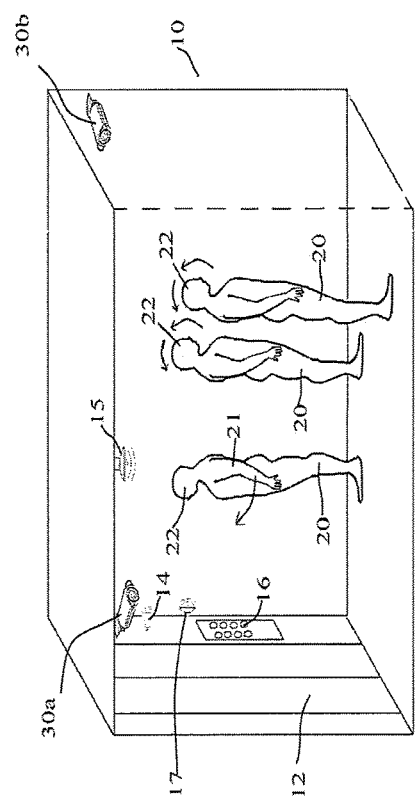
FIG. 1 is a left side perspective view of an elevator car controlled by the elevator control system according to one embodiment of the present invention, showing an imaging device inside the elevator car and multiple elevator passengers triggering a control system response.

FIGS. 1 and 2 depict two embodiments of the present invention. FIG. 1 shows elevator passengers 20, each having a face 22 which is in view of one or more imaging devices or cameras. As shown in FIG. 1, the imaging devices are positioned in the interior of elevator car 10 at any desired location, such as camera 30a at the front of the elevator car adjacent elevator car doors 12, or camera 30b at the rear of the elevator car. For best view, the cameras are positioned high on the wall at the rear of the elevator car, above typical head height, so that the camera may see multiple passengers' faces as they enter the elevator car. Upon entry into the elevator, the passenger may gesture with his head or move his face upwards, as indicated by the arrows around the passengers' upturned heads facing camera 30b, to provide a clear view to the camera. FIG. 1 shows elevator passengers 20 already present in the elevator car; however, the system of the present invention is also capable of recognizing passengers as they are entering the elevator car. When an elevator passenger's face is in a field of view of the imaging device, the passenger may be given a feedback signal which may be visual, such as an illuminated light 14 near the imaging device, or may be audible, emanating from a speaker 15 positioned in the elevator car. The imaging device or camera may alternatively be positioned outside of the elevator car 10, for example, on an adjacent wall 110 in a lobby, as shown in FIG. 2.

After detecting an elevator passenger's face in the imaging device's field of the view, the control system may use the imaging device 30 to capture an image of the passenger's face 22 and compare the captured image to initial facial images 82 in a facial image database 80, the facial image database storing the initial facial images and relating a designated authorized floor number 84 to each of the initial facial images. If the system determines a match between the captured image and a stored image, the elevator control system 100 may send a signal to initiate the elevator car's movement to the authorized floor 84. At this point, the passenger may be given another feedback signal indicating the selected floor, which signal may be visual, such as the selected floor button 16 illuminated on the elevator panel, or may be audible, emanating from a speaker 17 positioned near the elevator panel.

Specific body gestures or signals may also be used to trigger the system. Hand motions, arm motions, body motions and head movements may be recognized by the control system and used to trigger the system to move the elevator car to a specific floor, or in the alternative, to override the system and select a different floor. FIG. 1 shows a passenger 20 having an arm 21 which may be moved upwards towards the camera 30a in the direction of the arrow to override the system's floor section. Other gestures or signals used to trigger or override the system may include, but are not limited to, shaking of the passenger's head from side to side or raising an open palm towards the camera (not shown). In addition, an audio pickup device (not shown) may be positioned in the elevator car 10 to receive an audio transmission from the passenger. The audio transmission may be in the form of an audio segment or a voice command.

As shown in FIG. 1, the system is capable of recognizing more than one passenger simultaneously entering or present in the elevator car, and the system may use the imaging device to capture each passenger's facial image and attempt to determine a match between each captured image and a stored image prior to sending a signal to initiate the elevator car's movement to the authorized floor(s).

Figure 3:
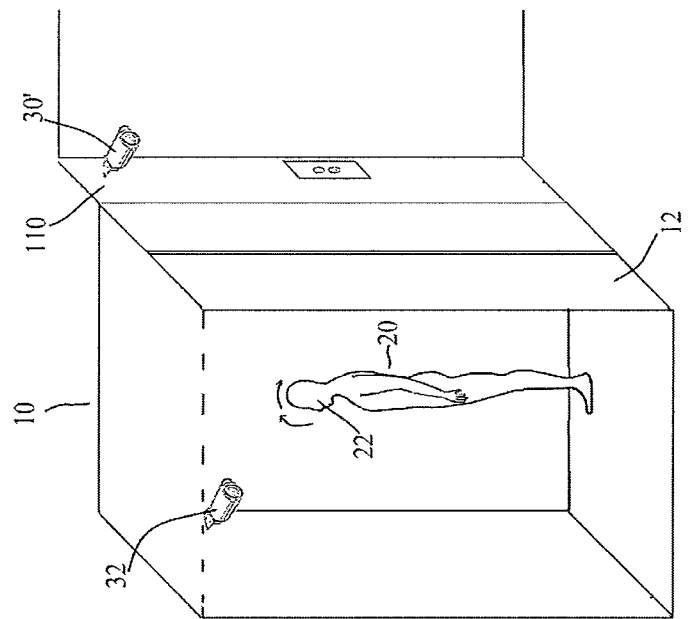
FIG. 3 is a left side perspective view of yet another embodiment of the present invention, showing an imaging device on an exterior wall adjacent to the elevator car and a passenger triggering a control system response, after which the passenger enters the elevator car to trigger the next control system response using a second imaging device in the elevator car.
Figure 3:
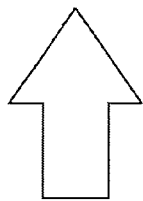
Figure 3:
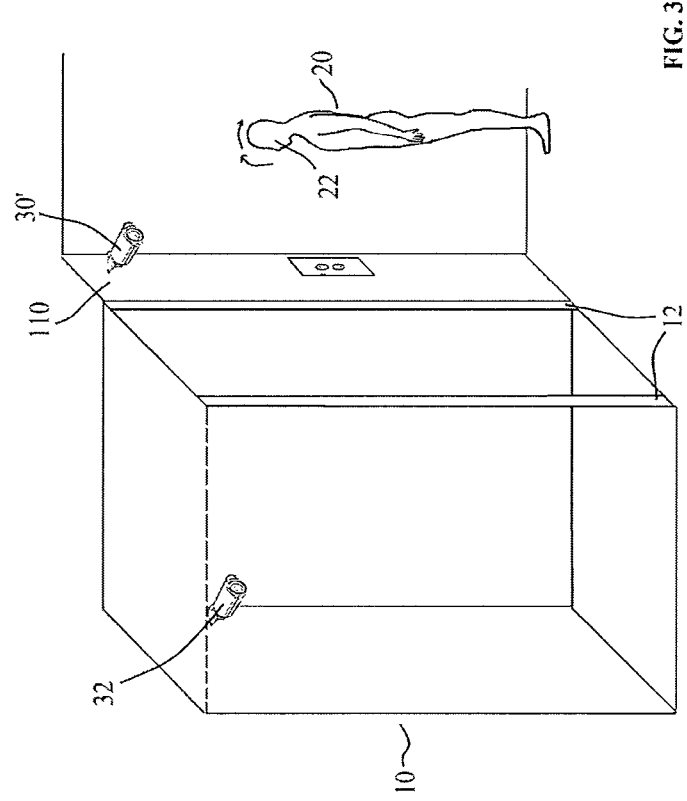

FIG. 3 depicts another embodiment of the elevator control system of the present invention, wherein the system includes two imaging devices or cameras, one imaging device positioned outside of the elevator car on an adjacent wall and one imaging device positioned inside of the elevator car. As shown in FIG. 3, a passenger 20 having a face 22 is in view of the imaging device or camera 30' positioned outside of the elevator car 10 on adjacent wall 110. The passenger may gesture with his head or move his face upwards, as indicated by the arrows around the passenger's upturned head facing camera 30', to provide a clear view to the camera. When an elevator passenger's face is in a field of view of the imaging device, the passenger may be given a feedback signal which may be visual or audible. After detecting an elevator passenger's face in the camera's field of the view, the control system may use the imaging device 30' to capture an image of the passenger's face 22 and compare the captured image to initial facial images 82 in a facial image database 80. If the system determines a match between the captured image and a stored image, the control system may call the elevator car 10, in the preferred up/down direction, to the floor of the building the passenger 20 is currently on and open the elevator car doors 12.

As further shown in FIG. 3, the passenger 20 may then enter the elevator car 10, where a second imaging device 32 is positioned. As depicted in FIG. 3, the second imaging device 32 is positioned at the rear of the elevator car, above typical head height, for best view, but may alternatively be positioned elsewhere in the interior of the elevator car, as desired. When the elevator passenger's face is in the field of view of the second imaging device, the passenger may be given another feedback signal which may be visual or audible. The passenger's face may be detected in the field of view of the second imaging device as the passenger enters the elevator car or after entry, as shown in FIG. 3. An image of the passenger's face 22 may then be captured using the second imaging device 32 and compared to initial facial images 82 stored in the facial image database 80. If a match is found, the elevator control system may initiate elevator car movement to the passenger's authorized floor 84. The passenger may be given a feedback signal indicating the selected floor, which signal may be visual, such as the selected floor button illuminated on the elevator panel, or may be audible, emanating from a speaker positioned near the elevator panel. The system is capable of recognizing more than one passenger simultaneously entering or present in the elevator car, therefore determining a match between an image captured by second camera 32 and a stored image accounts for additional passengers who enter the opened elevator car having not yet had their facial image captured. The system may use the second imaging device 32 to capture each passenger's facial image and attempt to determine a match between each captured image and a stored image prior to sending a signal to initiate the elevator car's movement to the authorized floor(s).

Figure 4:
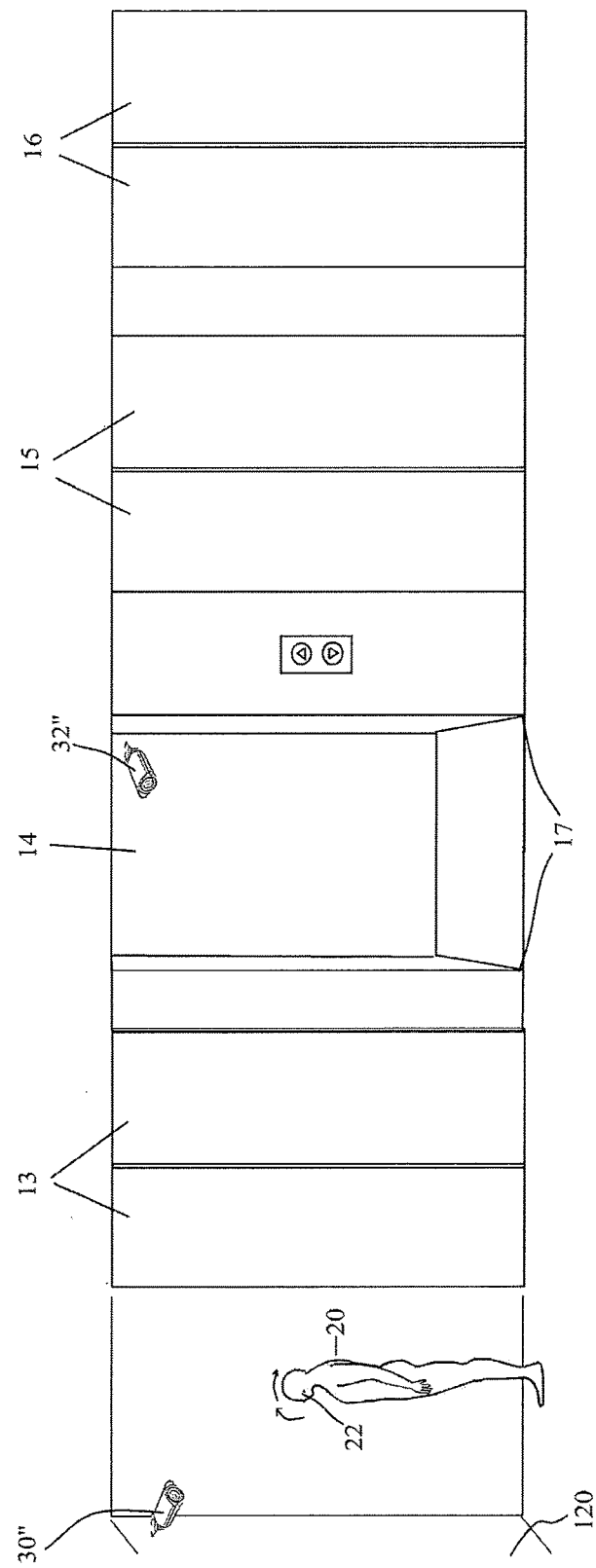
FIG. 4 is a plan view of yet another embodiment of the present invention, showing an imaging device on an exterior wall adjacent to a bank of elevators and a passenger triggering a system response to call an elevator car, and a second imaging device in the elevator car.

FIG. 4 depicts yet another embodiment of the elevator control system of the present invention, wherein the system includes at least two imaging devices or cameras, one imaging device positioned outside of a bank of elevator cars on an adjacent wall and one imaging device positioned inside of each elevator car. As shown in FIG. 4, imaging device or camera 30" is positioned on a wall 120 adjacent to a bank of elevator cars 13, 14, 15, 16. Passenger 20 having a face 22 is in view of the imaging device or camera 30". The passenger may gesture with his head or move his face upwards, as indicated by the arrows around the passenger upturned head facing camera 30", to provide a clear view to the camera. After detecting an elevator passenger's upturned head in the camera's field of the view, the control system may use the imaging device 30" to capture an image of the passenger's face 22 and compare the captured image to initial facial images 82 in a facial image database 80. If the system determines a match between the captured image and a stored image, the control system may call the elevator car 14, in the preferred up/down direction, to the floor of the building the passenger 20 is currently on and open the elevator car doors 17.

The passenger 20 may then enter the elevator car 14, where a second imaging device 32" is positioned. As in FIG. 3, the second imaging device 32" shown in FIG. 4 is positioned at the rear of the elevator car, above typical head height, for best view, but may alternatively be positioned elsewhere in the interior of the elevator car, as desired. The passenger's face may be detected in the field of view of the second imaging device 32" as the passenger enters the elevator car or after entry. After detecting an elevator passenger's upturned head in the camera's field of the view, an image of the passenger's face 22 may then be captured using the second imaging device 32" and compared to initial facial images 82 stored in the facial image database 80. If a match is found, the elevator control system may initiate elevator car movement to the passenger's authorized floor

84. The system is capable of recognizing more than one passenger simultaneously entering or present in the elevator car, therefore determining a match between an image captured by second camera 32" and a stored image accounts for additional passengers who enter the opened elevator car having not yet had their facial image captured. The system may use the second imaging device 32" to capture each passenger's facial image and attempt to determine a match between each captured image and a stored image prior to sending a signal to initiate the elevator car's movement to the authorized floor(s).

An optional system component may be included in any embodiment of the present invention for providing feedback to the users of the system. This component may include a speech system to greet and acknowledge the resident, and the speech system may also include speech recognition to allow the resident to override his/her default authorized floor selection when attempting to visit a different floor.

FIG. 5 shows a flowchart of the elevator control system of the present invention wherein an imaging device is positioned inside of the elevator car. The system program may begin at step 501 with the elevator car door opening and an elevator passenger approaching the imaging device (step 502). The program waits for a face to appear in the field of view of the imaging device. Once a face is in view, the imaging device captures a facial image and the program compares the captured facial image to facial image data which has been previously registered in a facial image database (steps 503 to 504). If a match is found (step 505), the program sends a signal to the elevator control system to move the elevator car to the passenger's authorized floor (step 506). If more than one passenger is present in the elevator car, the system will capture a facial image of each passenger and search for a match in the facial image database before sending a signal to the elevator control system to move the elevator car to each recognized passenger's authorized floor.

FIG. 6 shows a flowchart of the elevator control system of the present invention wherein an imaging device is positioned outside of the elevator car on an adjacent wall. The system program may begin at step 601 with the elevator passenger approaching the imaging device. The program waits for a face to appear in the field of view of the imaging device. Once a face is in view, the imaging device captures a facial image and the program compares the captured facial image to facial image data which has been previously registered in a facial image database (steps 602 to 604). If a match is found, the program calls the elevator car, in the preferred up/down direction, to the floor where the passenger is located (step 605) and waits for the passenger to enter the elevator car before sending a signal to the elevator control system to move the elevator car to the passenger's authorized floor (step 606). Alternatively, if no match was found, the program may search for another passenger face in the field of view of the imaging device. If a match is found, the program then sends the elevator car to the floor corresponding to the recognized face.

FIG. 7 shows a flowchart of the elevator control system of the present invention wherein a first imaging device is positioned outside of the elevator car on an adjacent wall, and a second imaging device is positioned inside of the elevator car. The system program may begin at step 701 with the elevator passenger approaching the first imaging device positioned outside of the elevator car. The program waits for a face to appear in the field of view of the first imaging device. Once a face is in view (step 702), the imaging device captures a facial image and the program compares the captured facial image to facial image data which has been previously registered in a facial image database (steps 703 to 704). If a match is found, the program calls the elevator car, in the preferred up/down direction, to the floor where the passenger is located and waits for the passenger to enter the elevator car (step 705). The elevator passenger then approaches the second imaging device positioned inside the elevator car at step 706. The program then waits for a face to appear in the field of view of the imaging device. Once a face is in view, the second imaging device captures a facial image and the program compares the captured facial image to facial image data in a facial image database (steps 707 to 709). If a match is found, the program sends a signal to the elevator control system to move the elevator car to the passenger's authorized floor (step 710). Alternatively, if no match was found, the program may search for another passenger face in the field of view of the imaging device. If a match is found, the program then sends the elevator car to the floor corresponding to the recognized face.

Figure 8:
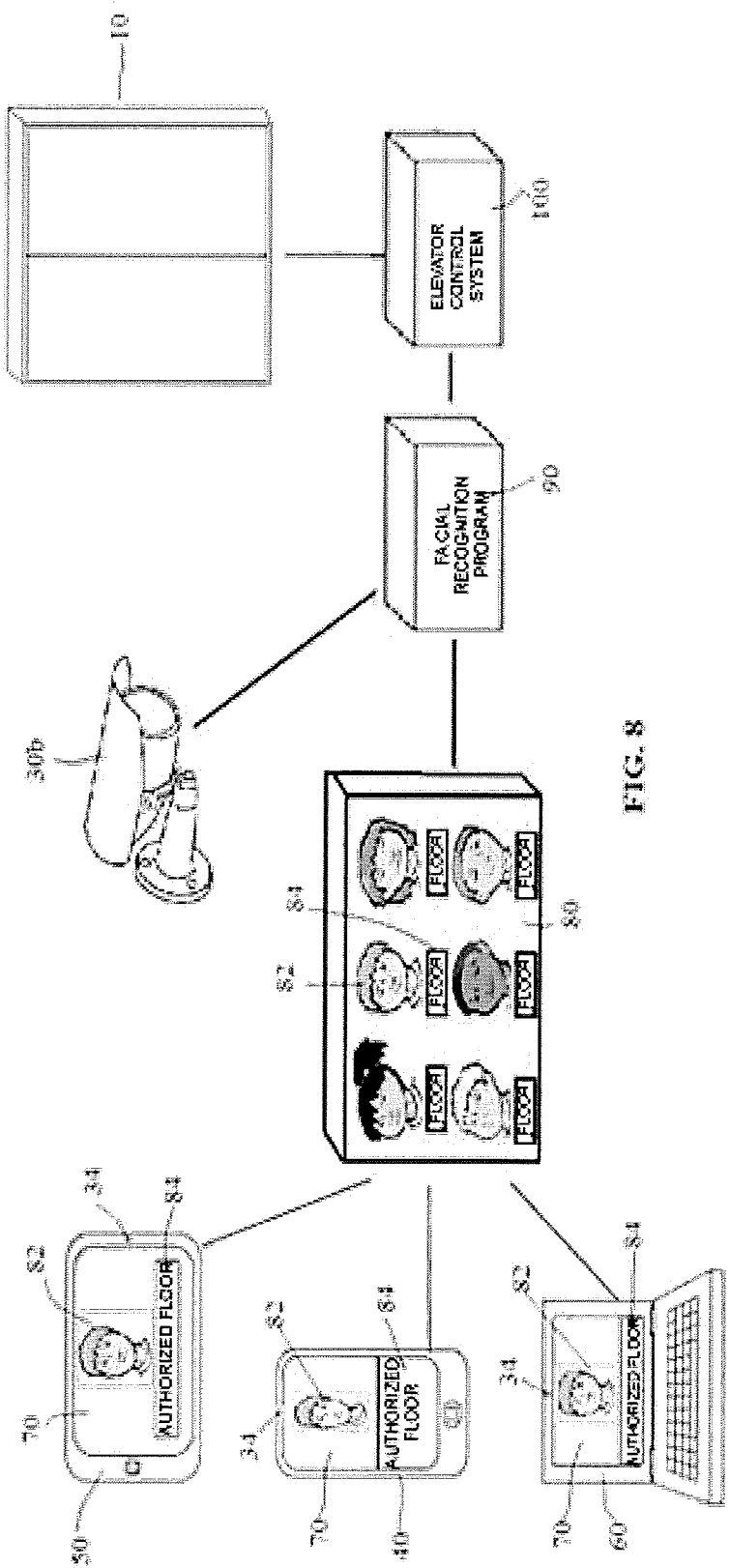
FIG. 8 is a pictorial representation in block diagram form of the elevator control system according to the present invention.

FIG. 8 shows in block diagram form a pictorial representation of one embodiment of the elevator control system according to the present invention. A prospective elevator passenger's face and corresponding authorized floor destination may be registered in the elevator control system using a software application running on a smartphone, tablet, or desktop/laptop computer. The elevator passenger's facial image 82 is captured by an imaging device 34 which is included in a smartphone 40, tablet 50, or other computing device 60 such as a laptop or desktop computer. The passenger's facial image 82 and authorized floor destination 84 is then registered in the facial image database 80 using a software application program 70 running on any of the aforementioned computer devices. When an elevator passenger's face 22 comes into the field of view of the imaging device 30b positioned inside the elevator car, the passenger's facial image is captured and the facial recognition program 90 then compares the captured facial image to facial image data 82 in the facial image database 80. If a match is found, the elevator control system 100 sends a signal to the elevator car 10 to move to the passenger's authorized floor destination 84.

An embodiment of an elevator control system of the present invention may take the form of an entirely hardware embodiment, or an embodiment that uses software (including firmware, resident software, micro-code, etc.). Furthermore, an embodiment may take the form of a computer program product on a tangible computer-usable storage medium having computer-usable program code embodied in the medium. A memory device or memory portion of a processor within elevator control system 100 as shown in FIG. 8 can form the medium. Computer program code or firmware to carry out an embodiment of the present disclosure could also reside on optical or magnetic storage media, especially while being transported or stored prior to or incident to the loading of the computer program code or firmware into an elevator control system. This computer program code or firmware can be loaded by connecting a computer system or external controller to the programming interface.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." The present invention may take the form of a computer program product embodied in one or more computer readable medium(s) having computer readable program code embodied thereon.

One or more computer readable medium(s) may be utilized, alone or in combination in elevator control system 100. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

Thus, the present invention provides one or more advantages over the prior art. The present invention provides an improved elevator control system which does not require physical contact between an elevator passenger and a button surface in the elevator car to select the desired floor. The present invention provides an elevator control system which implements facial recognition within the control system and which matches a floor location with a face recognized by the imaging portion of the system and initiates movement of the elevator car to that floor location. The present invention further provides an improved elevator control system which restricts access to certain floors for non-authorized persons.

While the present invention has been particularly described, in conjunction with a specific preferred embodiment, it is evident that many alternatives, modifications and variations will be apparent to those skilled in the art in light Thus, having described the invention, what is claimed is:

1. A method for controlling an elevator car using facial recognition, comprising the steps of:
   providing at least one elevator car, the at least one elevator car controlled by an elevator control system;
   providing a facial image database comprising facial image data of authorized passengers and corresponding authorized floor destination data for each such passenger;
   providing a facial recognition program capable of comparing a facial image stored in the facial image database to video data output from a first imaging device, the facial recognition program in communication with the elevator control system;
   providing a first imaging device capable of outputting video data;
   detecting an elevator passenger's upturned head and recognizing a facial image of the elevator passenger's face in a field of view of the first imaging device;
   capturing the elevator passenger's facial image using video data output from the first imaging device;
   comparing the captured facial image to the facial image data;
   determining a match between the captured facial image and a facial image stored in the facial image database;
   sending a signal to the elevator control system to call the at least one elevator car in a preferred up/down direction; and
   sending a signal to the elevator control system to move the at least one elevator car to the elevator passenger's authorized floor destination.

2. The method of claim 1 wherein the first imaging device is positioned inside the at least one elevator car.

3. The method of claim 2 wherein more than one elevator passenger is simultaneously entering or present in the at least one elevator car and the method is applied to each elevator passenger prior to sending a signal to the elevator control system to move the at least one elevator car to each elevator passenger's authorized floor destination.

4. The method of claim 1 wherein the first imaging device is positioned on an exterior wall adjacent to at least one elevator shaft containing the at least one elevator car.

5. The method of claim 1 wherein the facial image database is comprised of facial image data of authorized passengers captured by a remote imaging device, the remote imaging device included in at least one of a portable computing device and a stationary computing device.

6. The method of claim 1 further including the step of recognizing a specific body gesture of the elevator passenger to send a signal to the elevator control system to move the at least one elevator car to the elevator passenger's authorized floor destination or to override the signal to the elevator control system to move the at least one elevator car to the elevator passenger's authorized floor destination.

7. The method of claim 1 further including the step of providing at least one of a first feedback signal indicating the selected floor destination and a second feedback signal indicating the presence of a recognized elevator passenger in the field of view of the first imaging device, wherein the first and second feedback signals are at least one of visual and audible.

8. The method of claim 1 wherein the first imaging device is positioned on an exterior wall adjacent to at least one elevator shaft containing the at least one elevator car and wherein the facial recognition program is further capable of comparing a facial image stored in the facial image database to video data output from a second imaging device, and wherein the method further comprises the steps of:
   providing a second imaging device capable of outputting video data, the second imaging device positioned inside the at least one elevator car;
   prior to sending a signal to the elevator control system to move the at least one elevator car to the elevator passenger's authorized floor destination, detecting an elevator passenger's upturned head and recognizing a facial image of the elevator passenger's face in a field of view of the second imaging device;
   capturing the elevator passenger's facial image using video data output from the second imaging device;
   comparing the captured facial image to the facial image data;
   determining a match between the captured facial image and a facial image stored in the facial image database; and
   sending a signal to the elevator control system to move the at least one elevator car to the elevator passenger's authorized floor destination.

9. The method of claim 8 further including the step of providing a third feedback signal indicating the presence of a recognized elevator passenger in the field of view of the second imaging device, wherein the third feedback signal is at least one of visual and audible.

10. An automated elevator control system using facial recognition, comprising:
    at least one elevator car, the at least one elevator car controlled by an elevator control system;
    a facial image database comprising facial image data of authorized passengers and corresponding authorized floor destination data for each such passenger;
    a facial recognition program capable of comparing a facial image stored in the facial image database to video data output from a first imaging device, the facial recognition program in communication with the elevator control system; and
    a first imaging device capable of outputting video data;
    wherein, the system is capable of detecting an elevator passenger's upturned head and recognizing a facial image of the elevator passenger's face in a field of view of the first imaging device, capturing the elevator passenger's facial image using video data output from the first imaging device, and comparing the captured facial image to the facial image data, and
    wherein upon determining a match between the captured facial image and a facial image stored in the facial image database, sending a signal to the elevator control system to call the at least one elevator car in a preferred up/down direction and sending a signal to the elevator control system to move the at least one elevator car to the elevator passenger's authorized floor destination.

11. The automated elevator control system of claim 10 wherein the first imaging device is positioned inside the at least one elevator car.

12. The automated elevator control system of claim 11 wherein the system is capable of recognizing more than one elevator passenger simultaneously entering or present in the at least one elevator car.

13. The automated elevator control system of claim 10 wherein the first imaging device is positioned on an exterior wall adjacent to at least one elevator shaft containing the at least one elevator car.

14. The automated elevator control system of claim 10 wherein the facial image database is comprised of facial image data of authorized passengers captured by a remote imaging device, the remote imaging device included in at least one of a portable computing device and a stationary computing device.

15. The automated elevator control system of claim 10 further comprising at least one of a first feedback signal indicating the selected floor destination and a second feedback signal indicating the presence of a recognized elevator passenger in the field of view of the first imaging device, wherein the first and second feedback signals are at least one of visual and audible.

16. The automated elevator control system of claim 10 wherein the first imaging device is positioned on an exterior wall adjacent to at least one elevator shaft containing the at least one elevator car, and further comprising:
   a second imaging device capable of outputting video data, the second imaging device positioned in the at least one elevator car;
   wherein, prior to sending a signal to the elevator control system to move the at least one elevator car to the elevator passenger's authorized floor destination,
   the system is further capable of detecting an elevator passenger's upturned head and recognizing a facial image of the elevator passenger's face in a field of view of the second imaging device, capturing the elevator passenger's facial image using video data output from the second imaging device, and comparing the captured facial image to the facial image data, and
   wherein upon determining a match between the captured facial image and a facial image stored in the facial image database, sending a signal to the elevator control system to move the at least one elevator car to the elevator passenger's authorized floor destination.

17. The automated elevator control system of claim 16 further comprising a third feedback signal indicating the presence of a recognized elevator passenger in the field of view of the second imaging device, wherein the third feedback signal is at least one of visual and audible.

18. The automated elevator control system of claim 16 wherein the system is capable of recognizing more than one elevator passenger simultaneously entering or present in the at least one elevator car.

19. The automated elevator control system of claim 10 wherein the system is capable of recognizing a specific body gesture of the elevator passenger to send a signal to the elevator control system to move the at least one elevator car to the elevator passenger's authorized floor destination or to override the signal to the elevator control system to move the elevator car to the elevator passenger's authorized floor destination.

20. The automated elevator control system of claim 10 wherein the system is capable of recognizing a specific voice command by the elevator passenger to send a signal to the elevator control system to move the at least one elevator car to the elevator passenger's authorized floor destination or to override the signal to the elevator control system to move the elevator car to the elevator passenger's authorized floor destination.

* * * * *